United States Patent [19]

Yoshida et al.

[11] 4,081,421

[45] Mar. 28, 1978

[54] CURABLE RESIN COMPOSITION FOR ABRASION-RESISTANT COATING

[75] Inventors: Masaru Yoshida; Isao Kaetsu, both of Takasaki, Japan

[73] Assignee: Japan Atomic Energy Research Institute, Tokyo, Japan

[21] Appl. No.: 613,608

[22] Filed: Sep. 15, 1975

[30] Foreign Application Priority Data

Sep. 18, 1974 Japan .................................. 49-106778

[51] Int. Cl.$^2$ ....................... C08G 65/22; C08K 5/01; C08K 5/05; C08K 5/07
[52] U.S. Cl. ............................ 260/32.8 EP; 260/2 A; 260/29.2 EP; 260/30.4 EP; 260/33.4 EP; 260/33.6 EP; 260/33.8 EP; 428/413; 428/417; 428/418; 526/11.2

[58] Field of Search ........ 260/2 A, 29.2 EP, 30.4 EP, 260/32.8 EP, 33.4 EP, 33.6 EP, 33.8 EP

[56] References Cited

U.S. PATENT DOCUMENTS

| B 444,078 | 3/1976 | Stevens et al. ...................... 260/2 A |
|---|---|---|
| 3,444,111 | 5/1969 | Hickner ........................... 260/18 PF |

*Primary Examiner*—Harry Wong, Jr.
*Attorney, Agent, or Firm*—Ladas, Parry, Von Gehr, Goldsmith & Deschamps

[57] ABSTRACT

A curable resin composition for forming transparent abrasion-resistant coating on the surface of organic and inorganic materials comprising glycidol prepolymer. The composition can contain polymerizable alkoxysilane compounds in addition to glycidol prepolymer. The resulting coating has abrasion resistance far better than most known organic resins.

12 Claims, No Drawings

CURABLE RESIN COMPOSITION FOR ABRASION-RESISTANT COATING

BACKGROUND OF THE INVENTION

This invention relates to curable resin compositions to be used for forming coating with excellent abrasion resistance on the surface of plastic, inorganic glasses or metals.

Transparent plastics or so-called organic glasses are light materials having high impact strength and excellent workability and therefore are used in various fields such as glasses (panes and windshields) for vehicles interior decorations of buildings, glasses for meters and gauges, lenses of eyeglasses, etc. However, although plastics are tough and do not easily crack, they are inferior in surface hardness, especially in abrasion resistance and are easily scratched.

On the other hand, the inorganic glass has excellent resistance against scratch or abrasion, but it is dissatisfactory in that due to its poor impact strength it easily breaks and it is ground by repeated light impact applied on the surface thereof and is frosted. Most of metals are dissatisfactory, too, in that the surface thereof is rather easily scratched and abraded.

A measure often resorted to in order to improve abrasion resistance of the surface of solid materials is to coat the surface with a coating materials having good abrasion resistance. Hitherto, many attempts have been made to find excellent coating materials.

Among the known synthetic plastics, three dimensional polymers such as polymers of diethyleneglycol bis-allyl-carbonate or polyester resins and other thermosetting resins have the best abrasion resistance. And there has been found no coating materials having abrasion resistance superior to that of those polymers and comparable to that of inorganic glasses. Moreover, coating materials must be excellent in not only abrasion resistance but also in other various properties such as thermal resistance, chemical resistance, weatherability, etc. and thus these properties must be well balanced. Otherwise they cannot be used for practical purpose. From this view point, all the prior art coating materials are dissatisfactory and scarcely useful.

Accordingly the object of this invention is to provide a curable resin composition used for forming a coating having superior abrasion resistance well-balanced with other practical properties.

SUMMARY OF THE INVENTION

In accordance with the present invention, there is provided a curable resin composition to be used for forming abrasion-resistant coating comprising:
A. a prepolymer derived from glycidol, wherein said prepolymer may contain monoglycidol, by heating it together with a catalyst and a solvent,
B. a curing catalyst, and
C. a solvent.

According to one aspect of this invention, there is further provided a curable resin composition to be used for forming abrasion-resistant coating containing, in addition to the above-mentioned (A), (B) and (C),
D. at least one compound selected from the group consisting of:
  i. silicon compounds represented by any of the general formula

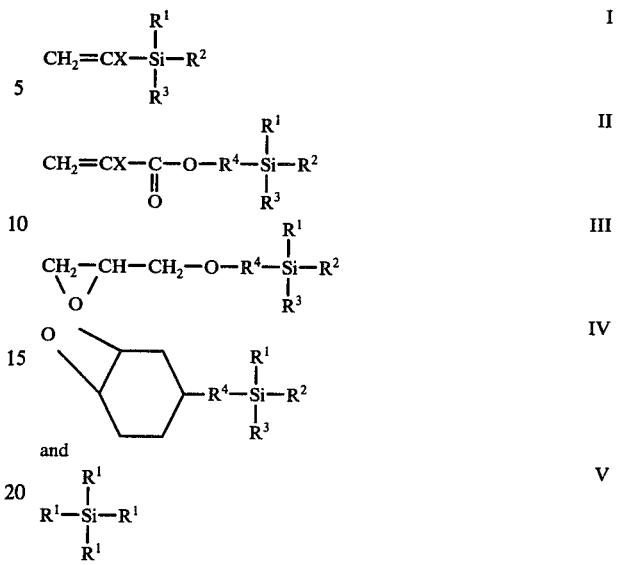

wherein $R^1$, $R^2$ and $R^3$ are respectively either $C_{1-6}$ alkoxy or alkoxyalkoxy and all of these may be the same, $R^4$ is $C_{1-6}$ alkylene, and X is either of hydrogen and methyl, or hydrolysates thereof, and
  ii. a polymer or copolymer of a polymerizable monomer containing at least one group selected from vinyl, allyl and hydrocarbyl having a triple bond in the molecule thereof.

In the composition of this invention, as mentioned above, each component is present in the following mixing ratio by weight. That is, of the total amount of (A) plus (C), (A) occupies 95–50% and (C) occupies 5–50%. (B) is added in a proportion of 0.05–10% of the total amount of (A) plus (C). (D), if used, is added in a proportion of 5–40% of the total amount of (A) plus (C).

DETAILED DESCRIPTION OF THE INVENTION

The compositions of this invention are prepared as explained below:

The prepolymer (A) can be prepared by heating glycidol together with a catalyst and a solvent to polymerize it. Examples of the catalyst used for this purpose include acids such as perchloric acid, hydrochloric acid, sulfuric acid, chlorosulfonic acid, p-toluenesulfonic acid, polyphosphoric acid, pyrophosphoric acid, iodic anhydride, trichloroacetic acid, periodic acid, etc.; halogens such as iodine and bromine; Lewis acids such as tin tetrachloride, boron trifluoride, titanium tetrachloride, aluminum trichloride, ion trichloride, etc. and complexes thereof with an organic ether or alcohol and the like; metal salts of organic acids such as cobalt laurate, zinc laurate, cobalt naphthenate, zinc naphthenate, cobalt octylate, zinc octylate, etc. Examples of the solvent (C) usable in the preparation of prepolymer (A) include methanol, ethanol, propyl alcohol, butyl alcohol, hexyl alcohol, benzyl alcohol, benzene, xylene, phenol, toluene, glycerine, ethylene glycol, diethylene glycol, triethylene glycol, dioxane, acetone, chloroform, water, etc.

The molecular weight of the prepolymer is not specifically defined. But, for instance, in the case of a solution consisting of 90% glycidol and the balance of a catalyst and a solvent, prepolymer (A) can be defined as that which is obtained when the polymerization reaction is conducted until the viscosity reaches a value within a range of 30 – 1000 cp and more preferably 50 – 400 cp, and most preferably 100 – 300 cp.

The curable resin composition according to this invention is a mixture of (A), (B) and (C), wherein catalyst (B) and solvent (C) are selected from the same groups of catalyst and solvent respectively as those previously listed with respect to the preparation of prepolymer (A). When prepolymer (A) is prepared in the manner as described above, the resulting reaction product generally contains all of (A), (B) and (C). In practice, however, the curable resin composition may be frequently prepared by mixing the reaction product containing prepolymer (A) prepared as above with additional amounts of (B) and (C).

Examples of compound (D) used in this invention include:

i. (I) vinyltrimethoxysilane, vinyltriethoxysilane, vinyltripropoxysilane; (II) methacryloxymethyl-trimethoxysilane, methacryloxymethyl-triethoxysilane, methacryloxymethyl-tripropoxysilane, acryloxymethyl-trimethoxysilane, acryloxymethyl-triethoxysilane, acryloxymethyl-tripropoxysilane, α-methacryloxyethyl-trimethoxysilane, α-methacryloxyethyl-triethoxysilane, α-methacryloxyethyl-tripropoxysilane, β-methacryloxyethyl-trimethoxysilane, β-methacryloxyethyl-triethoxysilane, β-methacryloxyethyl-tripropoxysilane, α-methacryloxypropyl-trimethoxysilane, α-methacryloxypropyl-triethoxysilane, α-methacryloxypropyl-tripropoxysilane, β-methacryloxypropyl-trimethoxysilane, β-methacryloxypropyl-triethoxysilane, β-methacryloxypropyl-tripropoxysilane, γ-methacryloxypropyl-trimethoxysilane, γ-methacryloxypropyl-triethoxysilane, γ-methacryloxypropyl-tripropoxysilane; (III) glycidoxymethyl-trimethoxysilane, glycidoxymethyl-triethoxysilane, glycidoxymethyl-tripropoxysilane, α-glycidoxyethyl-trimethoxysilane, α-glycidoxyethyl-triethoxysilane, α-glycidoxyethyl-tripropoxysilane, β-glycidoxyethyl-trimethoxysilane, β-glycidoxyethyl-triethoxysilane, β-glycidoxyethyl-tripropoxysilane, γ-glycidoxypropyl-trimethoxysilane, γ-glycidoxypropyl-triethoxysilane, γ-glycidoxypropyl-tripropoxysilane, β-glycidoxypropyl-trimethoxysilane, β-glycidoxypropyl-triethoxysilane, β-glycidoxypropyl-tripropoxysilane, α-glycidoxypropyl-trimethoxysilane, α-glycidoxypropyl-triethoxysilane, α-glycidoxypropyl-tripropoxysilane; (IV) 3,4-epoxycyclohexylmethyl-trimethoxysilane, 3,4-epoxycyclohexylmethyl-triethoxysilane, 3,4-epoxycyclohexylmethyl-tripropoxysilane, α-(3,4-epoxycyclohexyl)ethyl-trimethoxysilane, α-(3,4-epoxycyclohexyl)ethyl-triethoxysilane, α-(3,4-epoxycyclohexyl)ethyl-tripropoxysilane, β-(3,4-epoxycyclohexyl)ethyl-trimethoxysilane, β-(3,4-epoxycyclohexyl)ethyl-triethoxysilane, β-(3,4-epoxycyclohexyl)ethyl-tripropoxysilane, α-(3,4-epoxycyclohexyl)propyl-trimethoxysilane, α-(3,4-epoxycyclohexyl)propyl-triethoxysilane, α-(3,4-epoxycyclohexyl)propyl-tripropoxysilane, β-(3,4-epoxycyclohexyl)propyl-trimethoxysilane, β-(3,4-epoxycyclohexyl)propyl-triethoxysilane, β-(3,4-epoxycyclohexyl)propyl-tripropoxysilane, γ-(3,4-epoxycyclohexyl)propyl-trimethoxysilane, γ-(3,4-epoxycyclohexyl)propyl-triethoxysilane, γ-(3,4-epoxycyclohexyl)propyl-tripropoxysilane; (V) methyl silicate, ethyl silicate, propyl silicate, butyl silicate; and hydrolysates of these silicon compounds;

ii. a polymer or copolymer of any of dipropargyl maleate, dipropargyl fumarate, triallyl cyanurate, triacryl formal, diallyl maleate, diallyl itaconate, diallyl succinate, trimethylolpropane trimethacrylate, trimethylolpropane triacrylate, diethyleneglycol bis(allylcarbonate), diallyl benzenephosphate, diallyl benzenephosphonate, diethyleneglycol dimethacrylate, diethyleneglycol diacrylate, neopentyl glycol dimethacrylate, neopentylglycol diacrylate, hexanediol dimethacrylate, pentanediol dimethacrylate, pentanediol diacrylate, butanediol dimethacrylate, butanediol diacrylate, ethyleneglycol dimethacrylate, ethyleneglycol diacrylate, propyleneglycol dimethacrylate, propyleneglycol diacrylate, methyl acrylate, ethyl acrylate, butyl acrylate, propyl acrylate, methyl methacrylate, ethyl methacrylate, butyl methacrylate, propyl methacrylate, cyclohexyl methacrylate, cyclohexyl acrylate, glycidyl methacrylate, glycidyl acrylate, 2-ethylhexyl acrylate, 2-ethylhexyl methacrylate, acrylic acid, methacrylic acid, acrylamide, methacrylamide, acrylonitrile, methacrylonitrile, vinyltoluene, vinylcarbazole, vinylpyrrolidone, α-methyl styrene, maleic anhydride, etc.

When a hydrolysate of a silicon compound described in (i) above is used, it can be prepared by subjecting the silicon compound mixed with water and a water-soluble solvent such as water-soluble alcohols, dioxane, acetone, phenol, etc. to hydrolysis it in in the presence of a hydrolysis catalyst such as sulfuric acid, hydrochloric acid, chlorosulfonic acid, sulfuryl chloride, iron chloride, ethyl borate, naphthenic acid salt, ammonia, potassium hydroxide, sodium hydroxide, etc.

In order to prepare the polymer or copolymer described in (ii) above, a starting monomer may have previously been polymerized or copolymerized by heating it together with a radical polymerization catalyst or otherwise by applying light or an ionizing radiation thereto and the resulting polymer or copolymer is added to a mixture of (A), (B) and (C). Alternatively, the monomer per se may be added to a mixture of (A), (B) and (C) and the resulting mixture is subjected to polymerization by heating it with a radical polymerization catalyst or by applying light or an ionizing radiation thereto to provide a coating composition containing (A), (B), (C) and (D). The term "light or an ionizing radiation" used herein means visible and ultraviolet rays from a low-pressure or high-pressure mercury lamp, etc., sunbeam, α-rays, β-rays, γ-rays, electron beams, X-rays, neutron beams, mixed radiations emitted from a nuclear reactor, nuclear fission products, etc., wherein the wavelength of light may vary within a range of 1500 – 7000A and the dose rate in irradiation may vary within a range of $1 \times 10^2 - 5 \times 10^9$ rad per hour. The radical polymerization catalyst used in this invention includes any polymerization initiator generally capable of initiating polymerization reaction of radically polymerizable monomers such as peroxides, hydroperoxides, dinitriles, redox catalysts, etc.

According to this invention, addition of a compound or compounds of Group (D) which are optionally employed can impart a wide variety of properties to the resulting resin composition or the cured coating depending on particular use and properties required of the coated products. Thus, addition of a selected compound or compounds of Group (D) improves, for example, uniformity of the cured coating of neat (A); imparts flexibility; partially improves chemical resistance against some special reagents or solvent resistance; improves heat resistance, weatherability, abrasion resistance, workability, etc.; improves easiness in application of the coating composition; or improves the adhesive strength to the particular substrate depending on the employed substrate. Accordingly, a compound or compounds of group (D) may be suitablly selected for use depending on the requirements in particular applications.

The curable composition prepared as described above may be applied to various substrates by using various procedures to form a coating well-bonded to the substrate and having excellent abrasion resistance as well as good thermal resistance, chemical resistance, weatherability, etc. For this purpose, the curable composition of this invention may be applied on the surface of various substrate such as transparent or opaque plastics, inorganic glass, mirror materials, metals, etc. and then heated to a temperature within a range of 60° – 200° C. Also the curable composition of this invention may be applied on the inner surface of a mold and heated to a temperature of 60° – 200° C, after which a curable or polymerizable material is poured in the cavity of the mold and polymerized, followed by releasing from the mold; or otherwise the curable composition of this invention may be applied on a smooth-surfaced body and heated to 60° – 200° C to form a cured coating, which is then removed from the body, and the removed coating can be bonded to a solid body of plastics, inorganic glasses, mirrors or metals. Thus coating having excellent abrasion resistance, thermal resistance, chemical resistance, weatherability can be formed on various kinds of materials by using the composition of this invention.

The composition of this invention has good adhesion or bonding strength to organic and inorganic materials, and there is not necessity of precoating the substrate. In special cases, however, some kind of precoating may be provided before the composition of this material is applied.

Now the invention is illustrated by way of working examples, which are not limiting this invention. In the examples, with respect to proportion of materials, parts are by weight, if not specifically defined.

Also in the examples, abrasion resistance of the formed coating films was tested in accordance with the sand-falling method of ASTM D673-44 and "haze value" was determined according to the procedures of ASTM-D1003-61.

Surface hardness was tested by the method of JIS K5651, which is as follows.

The lead of a standard test pencil is exposed in the length of 3 mm without sharpening, the end surface of the exposed cylindrical lead is whetted flat on sand paper so that the circular peripheral edge of the end surface becomes sharp. The thus prepared pencil is positioned slant at the angle of 45° to the surface of a specimen to be tested. The end of the pencil lead is loaded with 1 kg, and the specimen is moved horizontally. The same test is repeated 5 times in different places on the surface. If scratches or break of the coating reaching the substrate is observed in two or more of 5 runs, the test is repeated with a pencil of one grade lower hardness. The hardness of the pencil, with which scratch is observed in less than 2 runs out of 5 runs, is indicated as the hardness of the tested specimen.

EXAMPLE 1

To 100 parts of glycidol, 10 parts of a 0.1% perchloric acid solution in ethyl alcohol was added, and the mixture was heated at 50° C for 14 hours to prepare a prepolymer solution. To this solution were added 10 parts of a solution containing 1% FC-430 surfactant (made by Hishie Chemical Co., Ltd.), in ethyl alcohol, 50 parts of ethyl alcohol and 10 parts of a 5% perchloric acid solution in ethyl alcohol.

The resulting solution was applied by dipping on the surface of a plate (3mm thick) of diethyleneglycol bis-(allylcarbonate) polymer and the plate was heated at 120° C for 5 hours to provide a transparent hard coating. This coating was 10μ thick and had pencil hardness of 3H. The haze value measured after the sand-falling test was 20.1% for the coating while the value for the substrate was 28.4%, which means the abrasion resistance was much improved.

EXAMPLE 2

To 100 parts of tetraethoxysilane, 100 parts of a 30% benzyl alcohol solution in methyl alcohol and 40 parts of an aqueous 0.1% hydrochloric acid solution were added, and the mixture was warmed at 50° C for not less than 30 hours to obtain a solution of hydrolysate of tetraethoxysilane.

To 100 parts of a glycidol prepolymer solution prepared in the same manner as Example 1 were added 20 parts of said hydrolysate solution, 50 parts of ethyl alcohol and 10 parts of a 5% perchloric acid solution in ethyl alcohol. The resulting solution was applied by spraying on the surface of a plate (3mm thick) of diethylene glycol bis(allylcarbonate) polymer and then heated at 110° C for 4 hours to provide a transparent hard coating, which was 10μ thick and had pencil hardness of 6H. The haze value measured after the sand-falling test was 10.6%, which means that the abrasion resistance was remarkably improved. Also it was found that the coating was excellent in weatherability, water resistance and chemical resistance, too.

EXAMPLE 3

To 100 parts of a glycidol prepolymer solution which has been prepared in the same manner as Example 1, 10 parts of acrylic acid, 10 parts of acrylamide, 5 parts of a 1.0% cobalt naphthenate solution in benzene, 10 parts of a 5% perchloric acid solution in ethyl alcohol and 40 parts of ethyl alcohol were added and a dose of $5 \times 10^5$ roentgens of γ-rays emitted from cobalt 60 were applied to the resulting mixture at a dose rate of $1 \times 10^5$ roentgens per hour to provide a composition comprising the glycidol prepolymer, acrylic acid-acrylamide copolymer, catalyst and solvent.

The thus obtained curable composition was applied on the surface of the polycarbonate resin and heated at 120° C for 5 hours, thereby a transparent hard coating was obtained. The coating was 10μ thick and had pencil hardness of 6H. The haze value measured after the sand-falling test was 12.6%, which means that the coating remarkably improved abrasion resistance of the polycarbonate resin. Also it was found that the coating was excellent in weatherability, chemical resistance, etc., too.

EXAMPLE 4

To 100 parts of glycidol, 10 parts of a 0.1% perchloric acid solution in ethyl alcohol was added, and the mixture was heated at 50° C for 14 hours to prepare a prepolymer solution. To this solution were added 10 parts of a solution containing 1% FC-430 surfactant in ethyl alcohol, 50 parts of ethyl alcohol and 10 parts of 5% perchloric acid solution in ethyl alcohol and mixed well.

To 100 parts of this solution, 30 parts of vinyltriethoxisilane was added and mixed well. The mixture (coating solution) was applied on the surface of a plate (3mm thick) of diethyleneglycol bis(allylcarbonate) polymer by spraying, and the plate was heated at 100° C for 5 hours to provide a transparent hard coating. This coating was 10μ thick and had pencil hardness of 4H. The haze value after the sand-falling test was 19.4%.

EXAMPLE 5

To 100 parts of the coating composition prepared in the same way as in Example 4, further 20 parts of β-methacryloxyethyl-trimethoxysilane was added and mixed well.

This mixture (solution) was applied on the surface of a plate (ca. 3 mm in thickness) of polymethyl methacrylate by spraying, and the plate was heated at 100° C for 4 hours to provide a transparent hard coating.

This coating was 20μ in thickness and had pencil hardness of 4H. The haze value after the sand-falling test was 19.6%. This means remarkable improvement in the surface hardness when it is considered the fact that the haze value of the polymethyl methacrylate substrate is 56%.

EXAMPLE 6

The glycidol prepolymer solution was prepared in the same way as in Example 4, and to this solution, 10 parts of a solution containing 1% FC-430 surfactant in chloroform/acetone (1:1 by volume) was added. To 100 parts of this solution, further 20 parts of γ-glycidoxypropyl-triethoxysilane was added and mixed well.

This mixture was applied on the surface of a plate (ca. 3 mm in thickness) of the polycarbonate resin, and the plate was heated at 120° C for 3 hours to provide a 13 mm thick transparent hard coating on it.

The pencil hardness of this coating was 5H. The haze value after the sand-falling test was 17.2%, while that of the polycarbonate substrate is 60%.

EXAMPLE 7

To 100 parts of the coating composition prepared in the same way as in Example 6, further 30 parts of β-(3,4-epoxycyclohexyl)ethyltrimethoxisilane was added and mixed well.

This mixture was applied on the surface of a plate (ca. 1 mm in thickness) of transparent polyvinyl chloride, and the plate was heated at 100° C for 4 hours to provide a transparent hard coating of 18μ thickness.

The pencil hardness was 4H. The haze value after the sand-falling test was 18.9%, while that of the polyvinyl chloride is 52%.

EXAMPLE 8

To 100 parts of the coating composition prepared by the procedures of Example 4, 5 parts of dipropargyl maleate, 5 parts of diethyleneglycol dimethacrylate and 10 parts of hydroxypropyl methacrylate were added and mixed well. To this mixture, further 5 parts of a 3% boron trifluoride-ethyl ether complex solution in n-butyl alcohol and 5 parts of 1% cobalt naphthenate solution in ethyl alcohol were added and mixed. The thus prepared mixture (solution) was irradiated with 1 × 10⁶ roentgens of gamma rays from cobalt-60 at a dose of 1 × 10⁶ roentgens.

The thus prepared coating composition was applied on the surface of a plate (3 mm thick) of polymethyl methacrylate, and the plate was heated at 100° C for 4 hours to provide a 10μ thick transparent hard coating.

The pencil hardness of this surface was 3H, and the haze value after the sand-falling test was 19.6%. This coating proved to be much improved in water resistance in comparison with the coating of Example 1 in the weathering test.

EXAMPLE 9

The coating composition of Example 1 was applied on the surface of an ordinary glass plate (3 mm thick) and cured in the same manner as in Example 1. The transparency of the substrate glass was well retained.

EXAMPLE 10

The coating composition of Example 1 was applied on the polished mirror surface of an aluminum plate (0.5 mm) and cured in the same manner as in Example 1. The reflection of the substrate mirror surface was retained, and the mirror surface was well protected against abrasion and oxidation.

What we claim is:

1. A curable resin composition for forming an abrasion-resistant coating consisting essentially of:
    A. 95-50% by weight of a prepolymer derived from glycidol by heating it together with a solvent therefor and a catalyst selected from the group consisting of mineral acids, sulfonic acid, polyphosphoric acid, pyrophosphoric acid, iodic acid, trichloroacetic acid, periodic acid, halogens, Lewis acids, complexes of Lewis acid and either of ether and alcohol, and laurates naphthenates and octylates of transition elements until the viscosity reaches a value of 3–100 cp, wherein said prepolymer may contain monomeric glycidol,
    B. 5-50% by weight of a solvent in which glycidol and said prepolymer derived from glycidol are soluble,
    C. 0.05-10% by weight based on the total amount of (A) and (B) of a polymerization catalyst that polymerizes glycidol and said prepolymer derived from glycidol, and optionally
    D. 5-40% by weight based on the total amount of (A) and (B) of compounds selected from the group consisting of compounds represented by any of the following chemical formulae:

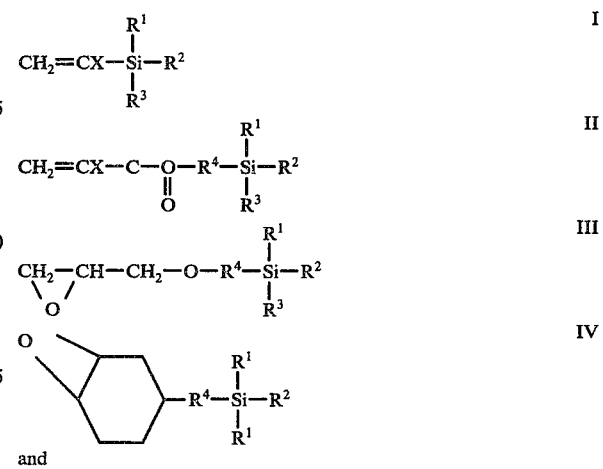

and

-continued

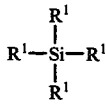

wherein $R^1$, $R^2$ and $R^3$ are respectively either of alkoxy and alkoxyalkoxy respectively having up to 6 carbon atoms, which may be the same or different; $R^4$ is alkylene having up to 6 carbon atoms and X is either of hydrogen and methyl; and hydrolysates thereof.

2. A composition according to claim 1, wherein said solvent is one selected from the group consisting of lower saturated monohydric alcohols, benzyl alcohol, benzene, xylene, phenol, toluene, glycerine, ethylene glycol, diethyleneglycol, triethyleneglycol, dioxane, chloroform, ketones and water.

3. A composition according to claim 2 wherein the proportion of glycidol and the solvent is 85:15–60:40 by weight; the amount of the catalyst used is 1–6%; and the solvent is selected from the group consisting of lower saturated monohydric alcohols, glycerine, ethylene glycol, diethylene glycol, triethylene glycol, benzene, toluene, chloroform, ketones and water; the catalyst is selected from the group consisting of mineral acids, sulfonic acid, Lewis acids, complexes of Lewis acid and either of ether and alcohol, laurates, naphthenates and octylates of transition elements; and the silicon compound is selected from the group consisting of tetra-lower-alkoxy-silanes having up to 16 carbon atoms, vinyl-tri-lower-alkoxy-silanes having up to 15 carbon atoms, acryloxy-lower-alkyl-trialkoxysilanes having up to 15 carbon atoms, methacryloxy-lower-alkyl-tialkoxysilanes having up to 16 carbon atoms and 3,4-epoxycyclohexyl-lower-alkyl-trialkoxysilanes having up to 18 carbon atoms.

4. A composition according to claim 3, wherein the proportion of glycidol and the solvent is 75:25–70:30 by weight, the amount of the catalyst used is 1–6%; the solvent is selected from the group consisting of methanol, ethanol, propyl alcohols, glycerine, ethylene glycol, benzene, chloroform and acetone; the catalyst is selected from the group consisting of perchloric acid, boron trifluoride and cobalt naphthenate; and the silicon compound is selected from the group consisting of tetraethoxysilane, vinyltriethoxysilane, β-methacryloxysilane, γ-glycidoxypropyltriethoxysilane, and β-(3,4-epoxycyclohexyl)ethyl-trimethoxysilane.

5. A curable resin composition for forming an abrasion resistant coating consisting essentially of:
A. 95–50% by weight of a prepolymer derived from glycidol by heating it together with a solvent therefor and a catalyst selected from the group consisting of mineral acids, sulfonic acids, polyphosphoric acid, pyrophosphoric acid, iodic acid, trichloroacetic acid, periodic acid, halogens, Lewis acids, complexes of Lewis acid and either of ether and alcohol, and laurates, naphthenates and octylates of transition elements until the viscosity reaches a value of 30–1000 cp, wherein said prepolymer may contain monomeric glycidol,
B. 5–50% by weight of a solvent in which glycidol and said prepolymer derived from glycidol are soluble, and
C. 0.05–10% by weight based on the total amount of (A) and (B) of a polymerization catalyst that polymerizes glycidol and said prepolymer derived from glycidol.

6. A composition according to claim 5, wherein said solvent is selected from the group consisting of lower saturated monohydric alcohols, benzyl alcohol, benzene, xylene, phenol, toluene, glycerine, ethyleneglycol, diethyleneglycol, triethyleneglycol, dioxane, chloroform, ketones and water.

7. A composition according to claim 6, wherein the proportion of glycidol and the solvent is 85:15 – 60:40 by weight; the amount of the catalyst used is 1 – 6%; and the solvent is selected from the group consisting of lower saturated monohydric alcohols, glycerine, ethyleneglycol, diethyleneglycol, triethyleneglycol, benzene, toluene, chloroform, ketones and water; and the catalyst is selected from the group consisting of mineral acids, sulfonic acids, Lewis acids, complexes of Lewis acid and either of ether and alcohol, and laurates, naphthenates and octylates of transition elements.

8. A composition according to claim 7, wherein the proportion of glycidol and the solvent is 75:25 – 70:30 by weight, the amount of the catalyst used is 1 – 6%; the solvent is selected from the group consisting of methanol, ethanol, propyl alcohols, glycerine, benzene, chloroform and acetone; and the catalyst is selected from the group consisting of perchloric acid, boron trifluoride and cobalt naphthenate.

9. A curable resin composition for forming an abrasion-resistant coating consisting essentially of:
A. 95–50% by weight of a prepolymer derived from glycidol by heating it together with a mineral acid polymerization catalyst and a lower saturated monohydric alcohol solvent until the viscosity reaches a value of 30–1000 cp, wherein said prepolymer may contain monomeric glycidol,
B. 5–50% by weight to a solvent in which glycidol and said prepolymer derived from glycidol are soluble,
C. 5–40% by weight based on the total amount of (A) and (B) of compounds represented by the general formula:

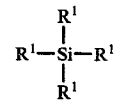

whereing $R^1$ is a $C_{1-6}$ alkoxy group or alkoxyalkoxy group.

10. A composition according to claim 9, wherein said mineral acid is perchloric acid.

11. A curable resin compsition for forming an abrasion-resistant coating consisting essentially of:
A. 95–50% by weight of a prepolymer derived from glycidol be heating it together with a mineral acid polymerization catalyst and a ower saturated monohydric alcohol solvent until the viscosity reaches a value of 30–1000 cp, wherein said prepolymer may contain monomeric glycidol
B. 5–50% by weight of a solvent in which glycidol and said prepolymer derived from glycidol are soluble, and
C. 0.05–10% by weight based on the total amount of (A) and (B) of a polymerization catalyst that polymerizes glycidol and said prepolymer derived from glycidol.

12. A composition according to claim 11 wherein said mineral acid is perchloric acid.

* * * * *